No. 728,341. PATENTED MAY 19, 1903.
L. A. WEYBURN.
PLOW.
APPLICATION FILED AUG. 27, 1902.
NO MODEL.
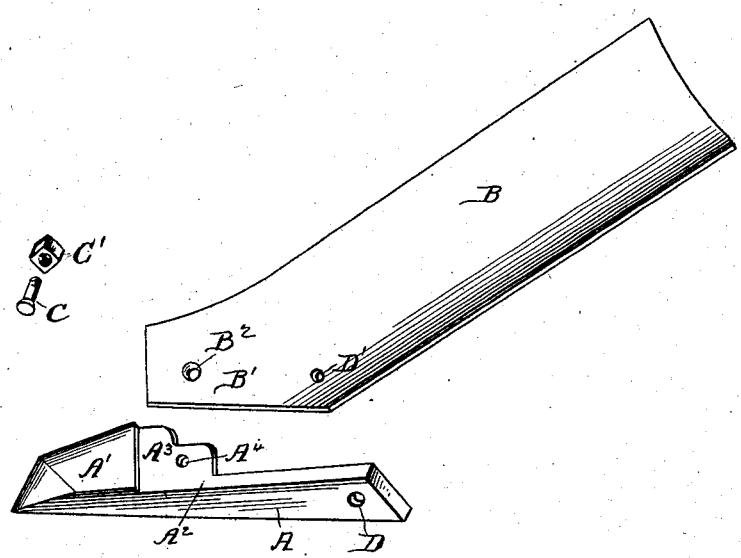
Witnesses,
Inventor,
Lewis A. Weyburn No. 728,341. Patented May 19, 1903.

UNITED STATES PATENT OFFICE.

LEWIS A. WEYBURN, OF ROCKFORD, ILLINOIS.

PLOW.

SPECIFICATION forming part of Letters Patent No. 728,341, dated May 19, 1903.

Application filed August 27, 1902. Serial No. 121,233. (No model.)

*To all whom it may concern:*

Be it known that I, LEWIS A. WEYBURN, a citizen of the United States of America, residing at Rockford, in the county of Winnebago and State of Illinois, have invented certain new and useful Improvements in Plows, of which the following is a specification.

My invention relates, specifically, to improvements in the points, landsides, and shares of plows. Its object is the production of combined landsides and points that can be expeditiously and rigidly secured to the shares of such plows without welding by means of bolts and nuts; and it consists of certain new and useful features of construction, combinations, and securing together of parts, all as hereinafter fully described, and specifically pointed out in the claim.

Reference is made to the accompanying drawing, forming a part of this specification, which embodies my invention.

Such drawing shows, in isometrical detail, a landside and point, a share, and a bolt and nut for securing the same together.

A A' are the integrally-formed landside and point of the plow, having a cut-away space $A^2$ therein to receive the front end of a share and provided with an attaching-web $A^3$, having a hole $A^4$ therethrough.

B is a share having its front end B' fashioned to fit into the cut-away space $A^2$ in the landside and point and its upper face flush with the upper face of such point A' and also having a hole $B^2$ therethrough registering with the hole $A^4$ in the attaching-web $A^3$.

C is a bolt to be inserted through the registered holes $A^4 B^2$ in the attaching-web $A^3$ and share B.

C' is a nut for securing the bolt C in position in the holes $A^4 B^2$ and the landside and point and share rigidly together.

D D' are bolt-holes wherethrough the rigidly-connected landside and point and share may be secured to the frog (not shown) of a plow.

By constructing the landside and point and share as shown in the drawing and securing them together by means of a bolt and nut in the manner described they become a rigid entity, serving every practical purpose that they would serve if they were welded together without the disadvantages and expense consequent upon such welding.

What I claim as new, and desire to secure by Letters Patent, is—

In an implement of the class described, in combination, an integrally-formed landside and point, having a cut-away space $A^2$ therein to receive the front end of a share, and provided with an attaching-web $A^3$ having a hole $A^4$ therethrough, a share having its front end fashioned to fit into the cut-away space $A^2$ in the landside and point and its upper face flush with the upper face of such point, and also having a hole $B^2$ therethrough registering with the hole $A^4$ in the attaching-web $A^3$, a bolt inserted through the holes $A^4$ and $B^2$, in the attaching-web and share, and a nut securing such bolt therein, substantially as described and for the purpose set forth.

In testimony whereof I have signed my name to this specification in the presence of two subscribing witnesses.

LEWIS A. WEYBURN.

Witnesses:
JOHN T. FORSELL,
A. R. MORGAN.